(12) United States Patent
Haumann

(10) Patent No.: US 9,387,750 B2
(45) Date of Patent: Jul. 12, 2016

(54) OPEN ROOF CONSTRUCTION FOR A VEHICLE

(71) Applicant: Inalfa Roof Systems Group B.V., Venray (NL)

(72) Inventor: Gerardus Franciscus Jacobus Haumann, Venray (NL)

(73) Assignee: Inalfa Roof Systems Group B.V., Oostrum (NL)

( * ) Notice: Subject to any disclaimer, the term of this patent is extended or adjusted under 35 U.S.C. 154(b) by 0 days.

(21) Appl. No.: 14/729,797

(22) Filed: Jun. 3, 2015

(65) Prior Publication Data

US 2015/0352935 A1 Dec. 10, 2015

(30) Foreign Application Priority Data

Jun. 4, 2014 (DE) .................... 20 2014 102 614 U

(51) Int. Cl.
*B60J 7/22* (2006.01)
*B60J 7/06* (2006.01)
*B60J 7/00* (2006.01)
*B60J 7/02* (2006.01)
*B60J 7/043* (2006.01)

(52) U.S. Cl.
CPC ............... *B60J 7/064* (2013.01); *B60J 7/0046* (2013.01); *B60J 7/024* (2013.01); *B60J 7/0435* (2013.01)

(58) Field of Classification Search
CPC .......... B60J 7/22; B60J 7/0046; B60J 7/0435; B60J 7/024
USPC .......................................................... 296/217
See application file for complete search history.

(56) References Cited

U.S. PATENT DOCUMENTS

| 4,702,518 | A | * | 10/1987 | Paerisch ................. B60J 7/0046 296/214 |
| 6,957,851 | B2 | | 10/2005 | Manders |
| 7,862,109 | B2 | * | 1/2011 | Geerets .................. B60J 7/0046 296/217 |
| 8,322,783 | B2 | | 12/2012 | Manders |

FOREIGN PATENT DOCUMENTS

| DE | 3419900 | | 11/1985 | |
| DE | 3641033 A1 | * | 6/1988 | ............. B60J 7/0046 |
| DE | 19946926 | | 10/2000 | |
| DE | 10304506 | | 8/2004 | |
| DE | 102007056797 | | 4/2009 | |
| DE | 102008006344 | | 4/2009 | |
| DE | 102012021850 | | 5/2014 | |

OTHER PUBLICATIONS

Search Report for corresponding German application 20 2014 102 614.2 filed Jun. 4, 2014.

* cited by examiner

*Primary Examiner* — Dennis H Pedder
(74) *Attorney, Agent, or Firm* — Steven M. Koehler; Westman, Champlin & Koehler, P.A.

(57) ABSTRACT

An open roof construction for a vehicle comprises a roof panel that is tiltable and can be moved in a longitudinal direction of the vehicle. Two movable cover assemblies cover a free space which in a tilted position of the roof panel is formed between corresponding ones of panel side edges and opening side edges. Each cover assembly comprises three rods, a first rod in a stationary position in the vicinity of a corresponding opening side edge, a second rod having a forward end pivotally connected to the stationary roof close to the corresponding opening side edge and a rearward end slidably connected to the corresponding panel side edge and a third rod positioned inward from the second rod and is biased for an inward movement. A flexible cover member extends at least from the first rod to the second rod and from the second rod to the third rod.

23 Claims, 4 Drawing Sheets

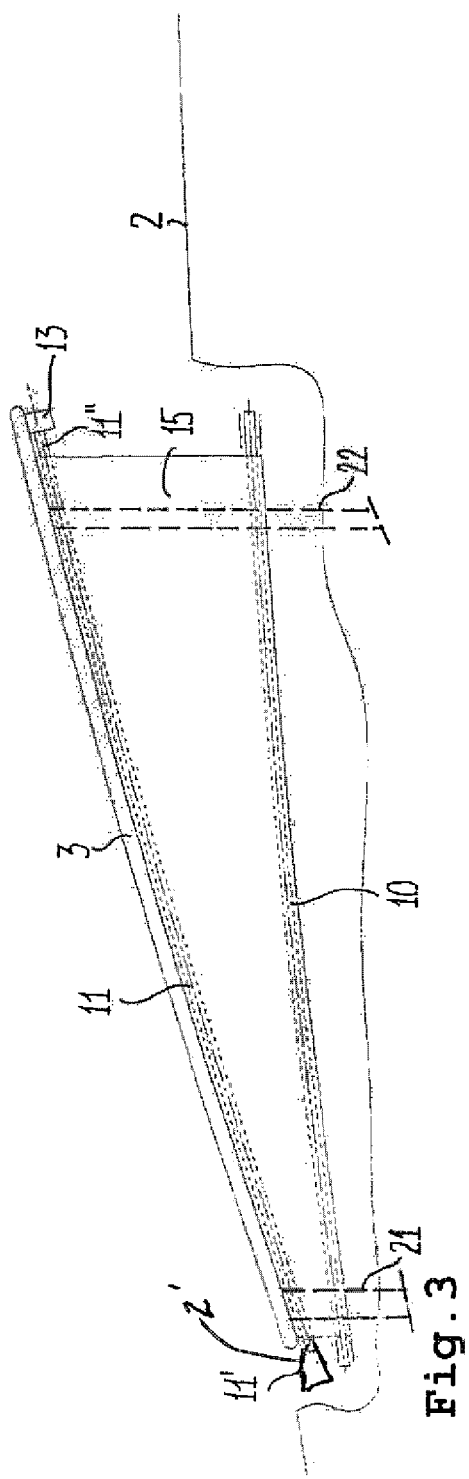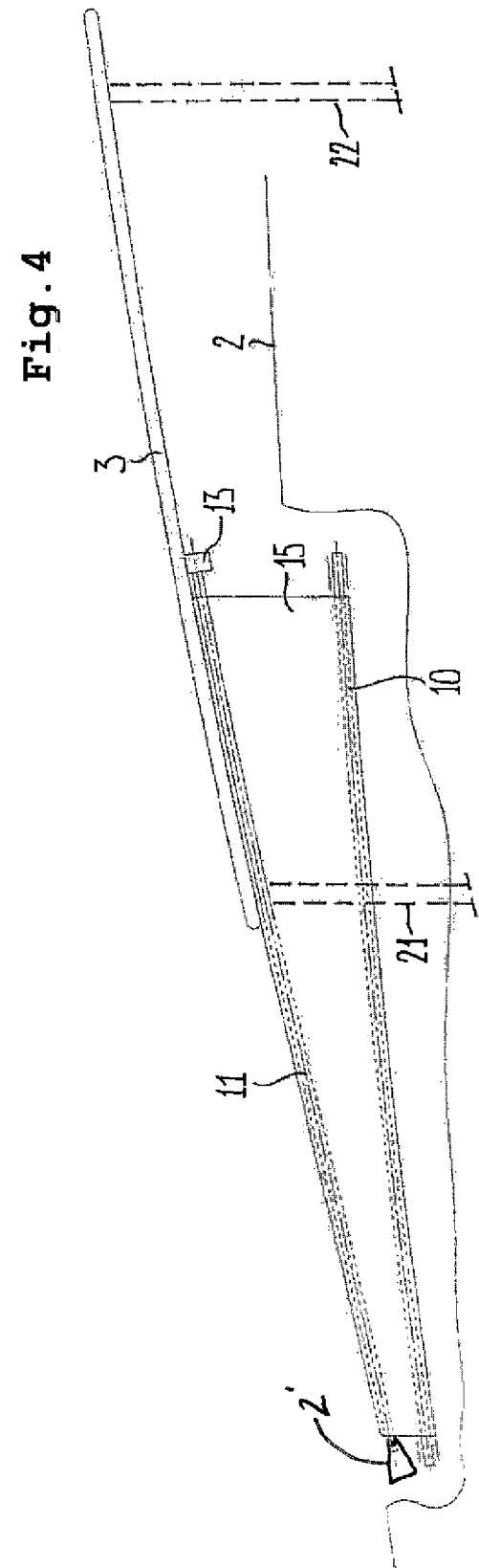

OPEN ROOF CONSTRUCTION FOR A VEHICLE

BACKGROUND

The discussion below is merely provided for general background information and is not intended to be used as an aid in determining the scope of the claimed subject matter.

Aspects of the invention relate to an open roof construction for a vehicle, comprising a roof opening in a stationary roof part and a roof panel which is movable for opening and closing said roof opening. The roof panel is of the type having, as seen in a longitudinal direction of the vehicle, a rear panel edge which by a tilting movement of the roof panel around a transversally extending tilting axis closer to a forward panel edge of the roof panel is tiltable upwards and downwards. The roof panel in a tilted position in which the rear panel edge is upwardly tilted, is movable in the longitudinal direction of the vehicle. The roof panel further comprises two opposite longitudinally extending panel side edges and the roof opening further comprises two opposite longitudinally extending opening side edges. The open roof construction further comprises two movable cover assemblies for covering a free space which in a tilted position of the roof panel is formed between corresponding ones of the panel side edges and opening side edges. Each cover assembly is movable relative to the roof panel for substantially maintaining a longitudinal position of the cover assembly when the roof panel moves in said longitudinal direction.

Such an open roof construction is known from DE-A1-34 19 900, which document shows cover members of which an inner edge is spring loaded for retraction into a receiving space.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

In accordance with an aspect of the present invention each cover assembly comprises three rods each extending substantially longitudinally, a first rod of which has a stationary position in the vicinity of a corresponding opening side edge, a second rod of which has a forward end pivotally connected to the stationary roof part close to the corresponding opening side edge and a rearward end slidably connected to the corresponding panel side edge and a third rod of which is positioned inward from the first rod and is biased for an inward movement. The cover assembly further comprises a flexible cover member extending at least from the first rod to the second rod and from the second rod to the third rod, which cover member substantially has a fixed longitudinal position.

The part of the cover member extending from the first rod to the second rod provides a desirable appearance of the cover assembly when viewed from the outside (thus from outside the vehicle). Likewise the part of the cover member extending from the second rod to the third rod provides a desirable appearance of the cover assembly when viewed from the inside (for example by an occupant of the vehicle). Together said two cover parts further assist in achieving the desired acoustic and aerodynamic performance.

When the roof panel is in a closed position, the third rod assumes an innermost position (i.e. closest to a longitudinal centerline of the vehicle). When the roof panel tilts, the second rod pivots and the third rod is pulled outwards (away from said centerline) by the cover member. Generally the opposite ends of the third rod will not move in the same amount. Finally, when the roof panel (in a tilted position) moves to the rear, the second rod will slide along the panel side edge for maintaining its longitudinal position.

It is noted that although the third rod is positioned inward from the first rod (thus closer to said centerline), this does not require that both rods are positioned at the same level. Further it is conceivable that the third rod not only is capable of carrying out an inward movement, but also is capable of more or less following the tilting movement of the panel.

In one embodiment of the open roof construction, the cover member defines a closed sleeve surrounding all three rods and extending between each pair of adjacent rods. The (cross sectional) shape of the sleeve will vary when the roof panel moves between its various positions (for example the sleeve may be flattened more when the roof panel closes the roof opening and the sleeve may have a more bulky shape when the roof panel is tilted). Moreover the sleeve may define different cross sectional shapes over its (longitudinal) extension.

The use of such a sleeve is very favorable in terms of appearance, acoustics and aerodynamics.

Then, in one embodiment, the sleeve can slide relative to all rods as considered in directions substantially perpendicular to the longitudinal direction. This offers the sleeve a maximum amount of freedom to move (while still being prevented in moving longitudinally relative to the rods).

However, it may be advantageous or even necessary to restrict this freedom of movement of the sleeve (for example for assuring that the sleeve in similar positions of the roof panel always has an identical position because, for example, the sleeve is not symmetrical or has parts with different properties). Thus, in one embodiment the sleeve is attached to at least one of the rods for eliminating the possibility of sliding relative to said rod. For example, the sleeve may be attached to the second rod. This offers the advantage that at the location of this second rod the sleeve may be provided with (or be shaped as) a guide extending over the entire width of the sleeve for a slidable cooperation with the corresponding panel side edge (offering a better cooperation than only by a rearward end that slidably engages the panel side edge). Such an attachment may be realised in many different manners, for example by providing the sleeve with a longitudinally extending pocket for receiving the first rod.

In an alternative embodiment of the open roof construction, the cover member extends only from the first rod to the second rod and from the second rod to the third rod. Then, the cover member does not extend between the first and third rods and therefore does not define a sleeve.

In such a case it is possible that the cover member is provided with pockets for receiving the first and third rods for eliminating the possibility of sliding relative to said rods but wherein the cover member can slide relative to the second rod.

In another embodiment the third rod is biased by spring(s), such as compression springs, tension springs, leaf springs or a resilient compressible body. The number and type of spring means may vary, as well as the position where these engage the third rod.

For example, the springs may be positioned within the outer limits of an imaginary body defined by the cover member.

As a result the springs are hidden from sight by the cover member. As an alternative the third rod may have two ends extending beyond the limits of the cover member and being engaged by springs which are located outside of such an imaginary body.

It is possible that the third rod has two opposite ends which are guided in guides. These guides result in a well-defined movement of the third rod and thus of the cover member. As an alternative, when no such guides are provided, the third rod may move rather freely (for example being pulled upward when the roof panel moves upward).

The cover member may be made of a material from the group comprising fabric, mesh material, rubber or EPDM. Other materials are conceivable too. Depending on the way in which the rods move relative to each other, it may be necessary that the material of the cover member is elastic.

In a special embodiment of the open roof construction, at least one of a panel side edge, corresponding opening side edge, first rod, second rod and third rod has a curved extension, as seen in a top plan view of the open roof construction.

Such curved extensions nowadays are used more and more in modern vehicles, both for aesthetical reasons as for technical reasons. The open roof construction herein described is well-equipped for coping with such curved extensions while keeping the cover member taut in all operational positions of the roof panel, leading to distinct aesthetic, acoustic and aerodynamic advantages.

BRIEF DESCRIPTION OF THE DRAWINGS

Hereinafter aspects of the invention will be elucidated while referring to the drawings, in which:

FIG. 3 shows a schematic side view of an embodiment in a tilted position,

FIG. 4 shows a view similar to FIG. 3, however in a different position, and

DETAILED DESCRIPTION OF THE ILLUSTRATIVE EMBODIMENTS

Figure 1:
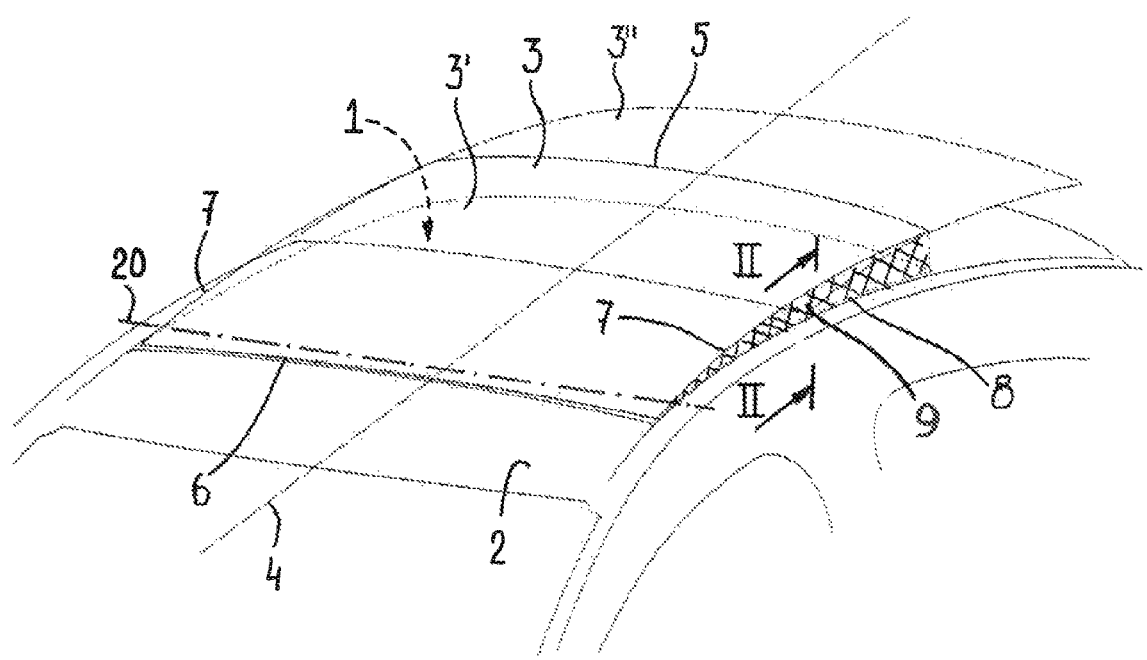
FIG. 1 schematically and perspectively shows an open roof construction in three different positions.

Referring first to FIG. 1, an open roof construction for a vehicle is illustrated in a schematic manner. The open roof construction comprises a roof opening 1 in a stationary roof part 2 of the vehicle. A roof assembly includes a roof panel 3 that is provided which is movable for opening and closing said roof opening 1. The roof panel 3 is of the type having, as seen in the longitudinal direction (and center line) 4 of the vehicle, a rear panel edge 5 which by a tilting movement of the roof panel 3 around a transversally extending tilting axis (schematically illustrated as 20 in FIG. 1, and which may be a physical axis or an imaginary axis defined by a mechanism for engaging and moving a forward part of the roof panel 3) closer to a forward panel edge 6 of the roof panel 3 is tiltable upwards and downwards.

In FIG. 1 the upwardly tilted position of the roof panel 3 has been illustrated by an outline in full lines. A position in which the roof panel 3 is not yet tilted and closes the roof opening 1, has been illustrated with an outline 3' in broken lines.

In a tilted position in which the rear panel edge 5 is upwardly tilted, the roof panel 3 is movable (to the rear) in the longitudinal direction 4 of the vehicle. In FIG. 1 a possible position which may be achieved by moving the tilted roof panel 3 to the rear, has been illustrated with an outline 3" in a chain line. It is noted that during such a rearward movement of the roof panel 3 generally its inclination will change too.

It is noted that the above described movements of the roof panel 3 are well known and thus do not need to be described or illustrated in detail. For achieving these movements moving or operating mechanisms (discussed below) may be applied (for example engaging both a forward part and a rearward part of the roof panel 3) which also are known per se and of which a further explanation is not required for understanding the present invention.

The roof panel further comprises two opposite longitudinally extending panel side edges 7, whereas the roof opening 2 comprises two opposite longitudinally extending opening side edges 8. Two movable cover assemblies 9 (only one is illustrated in FIG. 1) are provided for covering a free space which in a tilted position of the roof panel 3 is formed between corresponding ones of the panel side edges 7 and opening side edges 8.

Figure 2A:
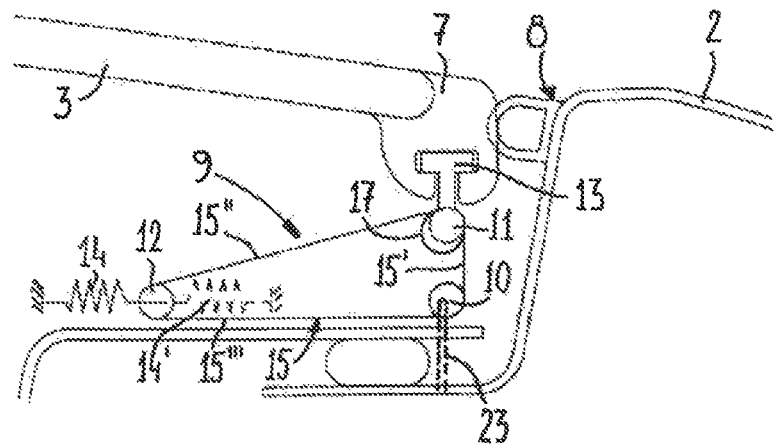
FIGS. 2a and 2b show a cross section according to II-II in FIG. 1 on a larger scale and in two different positions of the roof panel.
Figure 2B:
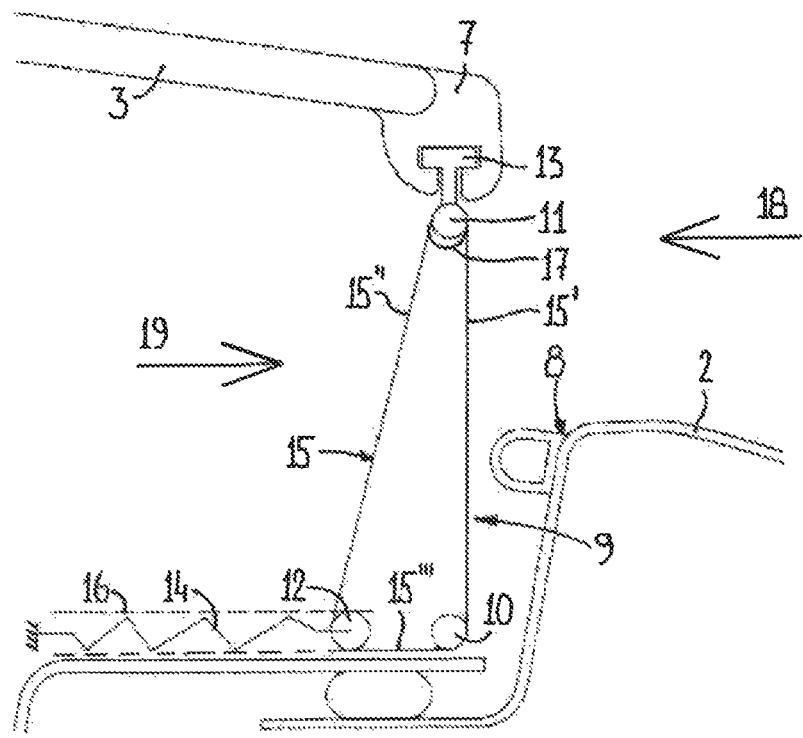

Referring to FIGS. 2a and 2b, which illustrate a cross section according to II-II in FIG. 1 in a position (FIG. 2a) in which the roof panel 3 closes the roof opening (according to 3' in FIG. 1) and in a position (FIG. 2b) in which the roof panel 3 is tilted to an open position (according to 3 in FIG. 1), it appears that each cover assembly 9 comprises three rods 10-12 each extending substantially longitudinally (that means substantially in parallel to the longitudinal direction 4 of the vehicle).

A first rod 10 has a stationary position in the vicinity of a corresponding opening side edge 8 and will be attached to a stationary part, for example: through a member 23 to the stationary roof part 2. A second rod 11 (see also FIGS. 3 and 4) has a forward end 11' pivotally connected to the stationary roof part 2 to portion 2' close to the corresponding opening side edge 8. This second rod 11 also has a rearward end 11" which by means of a slide part 13 is slidably connected to the corresponding panel side edge 7 (the slide part 13 may cooperate in a locking or non-locking manner with a guide provided at said panel side edge 7).

A third rod 12 is provided which is positioned inward from the first rod 10 (thus closer to a center line 4 of the vehicle). As appears from FIG. 2 this third rod 12 is biased for an inward movement by spring(s) 14, such as, for example, compression springs, tension springs, leaf springs or a resilient compressible body. The spring(s) 14 may be positioned within the outer limits of an imaginary body defined by a cover member 15 to be described later (as illustrated by spring means 14') or may be positioned outside such an imaginary body (for example engaging two opposite outer ends of the third rod 12 protruding from the cover member 15).

As illustrated schematically in FIG. 2b, the third rod 12 further may be guided in guides 16 (for example at its opposite outer ends) for defining a trajectory along which the third rod 12 will move. These guides 16, contrary to what has been illustrated, not necessarily have to extend horizontally, but also may be inclined or curved.

Each cover assembly 9 further comprises a flexible cover member 15 extending at least from the first rod 10 to the second rod 11 and from the second rod 11 to the third rod 12.

In the embodiment illustrated in FIGS. 2a and 2b, the cover member 15 defines a closed sleeve surrounding all three rods 10-12 and extending between each pair of adjacent rods (cover member parts 15', 15" and 15'''). In one embodiment the sleeve 15 can slide relative to all rods 10-12 as considered in directions substantially perpendicular to the longitudinal direction (that means in parallel to the plane of the drawing in FIGS. 2a and 2b). However, it is also possible that the sleeve 15 is attached to at least one of the rods 10-12 for eliminating the possibility of sliding relative to such rod(s). For example, in FIGS. 2a and 2b the sleeve 15 is provided with a longitudinally extending pocket 17 for receiving the second rod 11. This offers the advantage that at the location of this second rod 11 the sleeve 15 may be provided with (or be shaped as) a guide (not illustrated) extending over the entire width of the sleeve 15 for a slidable cooperation with the corresponding panel side edge 8 (offering a better cooperation than only by a slide part 13 at the rearward end 11" that slidably engages the panel side edge 8, as described before). Such a pocket may be stitched (or otherwise attached) to the original material of the sleeve 15.

In FIGS. 3 and 4 forward and rearward mechanisms 21 and 22, respectively, are shown schematically in broken lines but which in a manner known per se are responsible for the movement of the panel 3 between open and closed positions. In the schematic embodiment, the front and/or rear mechanisms 21, 22 change in vertical height, which can be accomplished by pivoting and/or sliding links, plates, etc. that vary the vertical height by sliding shoes (not shown) to which the links or plates are attached. The shoes slide upon a stationary guide rail (not shown) and commonly are driven by cable(s) from a hand crank or electric motor. In FIGS. 3 and 4, the rear mechanism 22 slides past a rear edge of the roof opening; however, this should not be considered limiting. Other operating mechanisms such as but not limited to the mechanisms in U.S. Pat. Nos. 8,322,783 and/or 6,957,851 (both of which are incorporated herein in their entirety) can also be used where the roof panel extends in a telescoping or extending manner in the tilted position. The front and/or rear mechanisms 21, 22 as well as the mechanisms in U.S. Pat. Nos. 8,322,783 and/or 6,957,851 can be configured so as to either operate within the space between flexible panels 15' and 15" or along side of either flexible panels 15' or 15". If mounted in the space between the flexible panels 15' and 15", portion 15'" may or may not be present, depending, for instance, on whether a space(s) is provided underneath the stationary guide so as to allow the flexible panel 15'" or plurality of spaced apart flexible panels 15'" to slide under the stationary guide.

In the closed position of the roof panel 3 (FIG. 2a) the spring(s) 14 has pulled the third rod 12 to an extreme inner position while keeping all parts 15', 15" and 15'" of the sleeve 15 taut. When the roof panel 3 moves to a tilted position (as illustrated in FIG. 2b and FIG. 3) the second rod 11 (as a result of being connected to the panel side edge 7 by the slide part 13) moves along with the roof panel 3 while pivoting around its forward end 11'. This results in an increase of the distance between the first rod 10 and second rod 11, leading to an outward movement of the third rod 12 (away from the center line 4 and closer to the opening side edge 8) caused by the tension in the sleeve 15. As illustrated in FIG. 3, each of the cover member parts 15' and 15" form generally planar sheets or flexible panels where a front end proximate end 11' of rod 11 is shorter in vertical length than a rear end proximate end 11" of rod 11 due to the tilted position of the second rod 11 relative to the first rod 10.

When, in such a tilted position, the roof panel 3 moves to the rear (see FIG. 4) the cover assembly 9 substantially will maintain its longitudinal position (it will not move along to the rear with the roof panel 3). The slide part 13 of the second rod 11 will slide along the panel side edge 7 and during such a movement the second rod 11 generally also will move downward because the slide part 13 with rearward end 11" of the second rod 11 will assume a lower position as a result of the inclination of the roof panel 3. This also will lead to a movement of the third rod 12 inwardly (caused by the spring(s) 14 or 14').

As viewed from the outside (arrow 18 in FIG. 2b) and from the inside (arrow 19 in FIG. 2b) the sleeve 15 presents an aesthetic appearance to the open roof construction, while providing acoustic and aerodynamic advantages.

Figure 5:
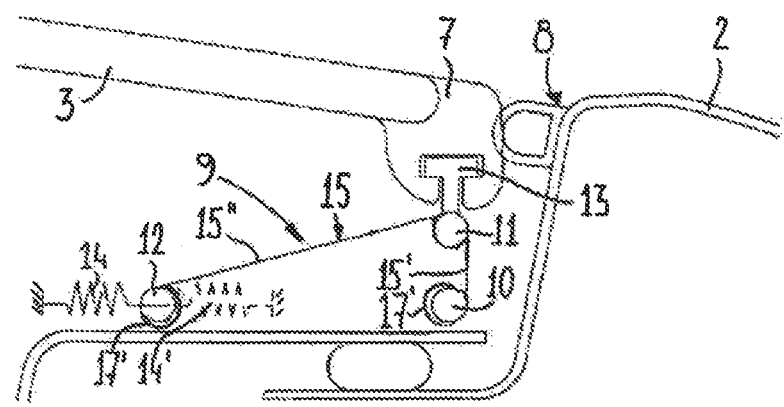
FIG. 5 shows an alternative embodiment in a manner similar to FIG. 2b.

In an embodiment illustrated in FIG. 5, the cover member 15 extends only from the first rod 10 to the second rod 11 (part 15') and from the second rod 11 to the third rod 12 (part 15"). In comparison to the embodiment of FIG. 2b, the cover member 15 is lacking between the first rod 10 and the third rod 12 in this embodiment. For assuring that the cover member 15 is kept taut in such an embodiment, it may be provided with pockets 17' for receiving the first rod 10 and third rod 12 for eliminating the possibility of sliding relative to said rods. Such pockets 17' may be devised in accordance with pocket 17 discussed before. The cover member 15, however, can slide relative to the second rod 11 in such an embodiment.

As an example, the cover member may be made of a material from the group comprising fabric, mesh material, rubber or EPDM. For coping with varying shapes of the cover member or sleeve 15 in different positions of the roof panel 3 it may be required that the cover member material is elastic (there might occur situations in which it otherwise is not possible to maintain all of the cover member or sleeve 15 in a taut state when the material thereof is flexible, but not elastic).

As is the case in many modern vehicles, at least one of a panel side edge 7, corresponding opening side edge 8, first rod 10, second rod 11 and third rod 12 may have a curved extension, as seen in a top plan view of the open roof construction. For example such a curved extension of the panel side edges 7 and opening side edges 8 is illustrated in FIG. 1. The assembly herein described allows to effectively cover the gap between a panel side edge 7 and opening side edge 8 in such situations.

Although the subject matter has been described in language directed to specific environments, structural features and/or methodological acts, it is to be understood that the subject matter defined in the appended claims is not limited to the environments, specific features or acts described above as has been held by the courts. Rather, the environments, specific features and acts described above are disclosed as example forms of implementing the claims.

What is claimed is:

1. An open roof construction for a vehicle, having a roof opening in a stationary roof part, the open roof construction comprising:
   a roof panel which is movable for opening and closing said roof opening, wherein the roof panel is of the type having, as seen in a longitudinal direction of the vehicle, a rear panel edge which by a tilting movement of the roof panel around a transversally extending tilting axis closer to a forward panel edge of the roof panel is tiltable upwards and downwards, and wherein the roof panel in a tilted position in which the rear panel edge is upwardly tilted, is movable in the longitudinal direction of the vehicle, wherein the roof panel further comprises two opposite longitudinally extending panel side edges and the roof opening further comprises two opposite longitudinally extending opening side edges; and
   two movable cover assemblies configured to cover a free space which in a tilted position of the roof panel is formed between corresponding ones of the panel side edges and opening side edges, wherein each cover assembly is movable relative to the roof panel for substantially maintaining a longitudinal position of the cover assembly when the roof panel moves in said longitudinal direction, wherein each cover assembly comprises:
- three rods each extending substantially longitudinally, a first rod of which has a stationary position in the vicinity of a corresponding opening side edge, a second rod of which has a forward end pivotally connected to the stationary roof part close to the corresponding opening side edge and a rearward end slidably connected to the corresponding panel side edge and a third rod of which is positioned inward from the first rod and is biased for an inward movement; and
- a flexible cover member extending at least from the first rod to the second rod and from the second rod to the third rod, which cover member substantially has a fixed longitudinal position.

2. The open roof construction according to claim 1, wherein the cover member defines a closed sleeve surrounding all three rods and extending between each pair of adjacent rods.

3. The open roof construction according to claim 2, wherein the sleeve slides relative to all rods as considered in directions substantially perpendicular to the longitudinal direction.

4. The open roof construction according to claim 2, wherein the sleeve is attached to at least one of the rods in a manner to eliminate the possibility of sliding relative to said rod.

5. The open roof construction according to claim 4, wherein the sleeve is attached to the second rod.

6. The open roof construction according to claim 5, wherein the sleeve is provided with a longitudinally extending pocket configured to receive the second rod.

7. The open roof construction according to claim 1, wherein the cover member extends only from the first rod to the second rod and from the second rod to the third rod.

8. The open roof construction according to claim 7, wherein the cover member is provided with pockets configured to receive the first and third rods for eliminating the possibility of sliding relative to said rods but wherein the cover member can slide relative to the second rod.

9. The open roof construction according to claim 1, and further comprising a spring coupled to the third rod so as to bias the third rod.

10. The open roof construction according to claim 9, wherein the spring is positioned within the outer limits of an imaginary body defined by the cover member.

11. The open roof construction according to claim 1, wherein the third rod has two opposite ends which are guided in guides.

12. The open roof construction according to claim 1, wherein the cover member is made of a material from the group comprising fabric, mesh material, rubber or EPDM.

13. The open roof construction according to claim 1, wherein at least one of a panel side edge, corresponding opening side edge, first rod, second rod and third rod has a curved extension, as seen in a top plan view of the open roof construction.

14. A method of operating a roof assembly for a roof opening in a roof of a vehicle, the method comprising:
- providing a roof panel configured to open and close the roof opening, wherein the roof panel is of the type having, as seen in a longitudinal direction when mounted in the vehicle, a rear panel edge, a forward panel edge and two opposite longitudinally extending panel side edges; and two cover assemblies wherein a cover assembly is provided proximate each side edge wherein each cover assembly comprises a first rod mounted to a stationary part of the roof along a side edge of of the roof opening, a second rod mounted to the roof panel to move therewith above the first rod, a third rod movably mounted to the stationary part of the roof inwardly and a flexible cover member extending at least from the first rod to the second rod and from the second rod to the third rod; and
- tilting the roof panel so that the rear edge is above the front edge to extend the flexible cover and create flexible panels from the first rod to the second rod and from the second rod to the third rod.

15. The method of claim 14 wherein providing includes biasing the third rod inwardly away from the first rod, and wherein tilting causes movement of the third rod under biasing toward the first rod and the flexible panels remain taut in the tilted position of the roof panel.

16. The method of claim 15 wherein providing comprises pivotally connecting an end of the second rod to the stationary part of the roof, and tilting comprising pivoting the second rod.

17. The method of claim 16 and further comprising sliding the roof panel in the tilted position rearwardly while the cover members remaining stationary.

18. A roof assembly for a roof opening in a vehicle, the roof assembly comprising:
- a roof panel configured to open and close the roof opening, wherein the roof panel is of the type having, as seen in a longitudinal direction when mounted in the vehicle, a rear panel edge, a forward panel edge and two opposite longitudinally extending panel side edges; and
- two cover assemblies wherein a cover assembly is provided proximate each side edge extending downwardly, wherein the roof panel is movable relative to each cover assembly when the roof panel moves in said longitudinal direction, wherein each cover assembly comprises:
  - three rods each extending substantially longitudinally, a first rod spaced apart from a side edge of the roof panel, a second rod of which has a forward end configured to be pivotally connected to a stationary roof part and a rearward end slidably connected to the corresponding panel side edge and a third rod of which is positioned inward from the first rod; and
  - a flexible cover member having flexible panels extending at least from the first rod to the second rod and from the second rod to the third rod.

19. The roof assembly according to claim 18, wherein the cover member defines a closed sleeve surrounding all three rods and extending between each pair of adjacent rods.

20. The roof assembly according to claim 18, wherein the cover member extends only from the first rod to the second rod and from the second rod to the third rod.

21. The roof assembly according to claim 18, and further comprising a spring coupled to the third rod so as to bias the third rod.

22. The roof assembly according to claim 18, wherein the third rod has two opposite ends which are guided in guides.

23. The roof assembly according to claim 18, wherein at least one of a panel side edge, corresponding opening side edge, first rod, second rod and third rod has a curved extension, as seen in a top plan view of the open roof construction.

* * * * *